(12) United States Patent
Naoi et al.

(10) Patent No.: US 8,273,482 B2
(45) Date of Patent: Sep. 25, 2012

(54) ELECTRODE

(75) Inventors: Katsuo Naoi, Tokyo (JP); Kazutoshi Emoto, Tokyo (JP); Kiyonori Hinoki, Tokyo (JP); Masahiro Saegusa, Tokyo (JP); Kenji Nishizawa, Tokyo (JP); Mitsuo Kougo, Tokyo (JP)

(73) Assignee: TDK Corporation, Tokyo (JP)

( * ) Notice: Subject to any disclaimer, the term of this patent is extended or adjusted under 35 U.S.C. 154(b) by 200 days.

(21) Appl. No.: 12/560,870

(22) Filed: Sep. 16, 2009

(65) Prior Publication Data

US 2010/0075224 A1   Mar. 25, 2010

(30) Foreign Application Priority Data

Sep. 24, 2008   (JP) .................................. 2008-244642

(51) Int. Cl.
*H01M 4/74* (2006.01)
*H01M 4/64* (2006.01)

(52) U.S. Cl. ........................................ 429/241; 429/517

(58) Field of Classification Search .................. 429/209, 429/233, 241, 242, 243, 244, 517
See application file for complete search history.

(56) References Cited

U.S. PATENT DOCUMENTS

| | | | | |
|---|---|---|---|---|
| 704,739 | A * | 7/1902 | Entz | 429/239 |
| 6,582,855 | B1 * | 6/2003 | Miyamoto et al. | 429/235 |

FOREIGN PATENT DOCUMENTS

| | | |
|---|---|---|
| JP | A-09-134726 | 5/1997 |
| JP | A-2002-246032 | 8/2002 |
| JP | A-2004-103462 | 4/2004 |

* cited by examiner

*Primary Examiner* — Ula C. Ruddock
*Assistant Examiner* — Thomas H. Parsons
(74) *Attorney, Agent, or Firm* — Oliff & Berridge, PLC

(57) ABSTRACT

An electrode having a current collector with a plurality of through holes, and active material layers provided on both sides of the current collector. The current collector has projections extending on the top side or on the back side of the current collector from edges of the through holes, and an angle between each of the projections and a surface direction of the current collector is in the range of 30 to 80°.

3 Claims, 5 Drawing Sheets

Fig.4
(A)
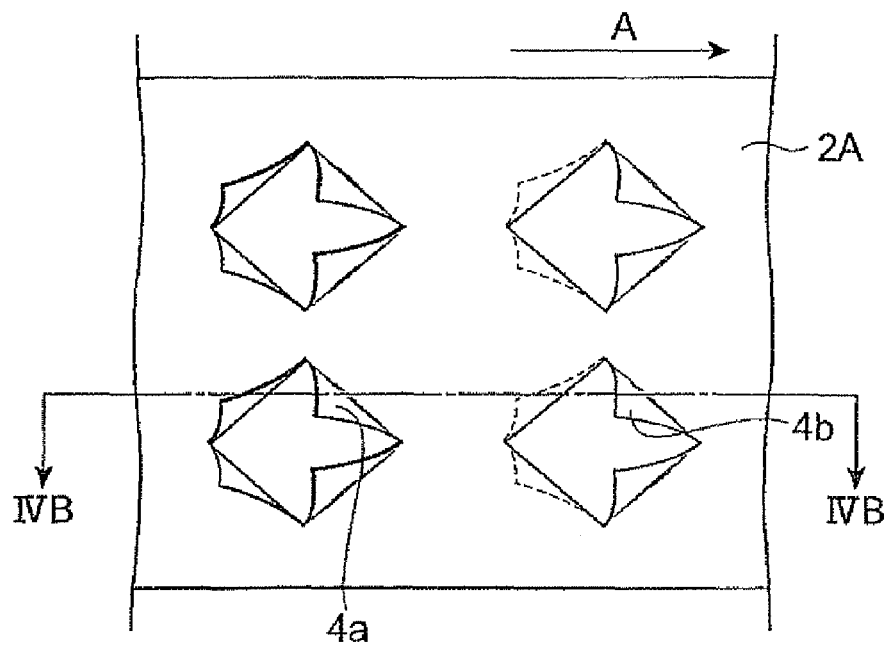
(B)
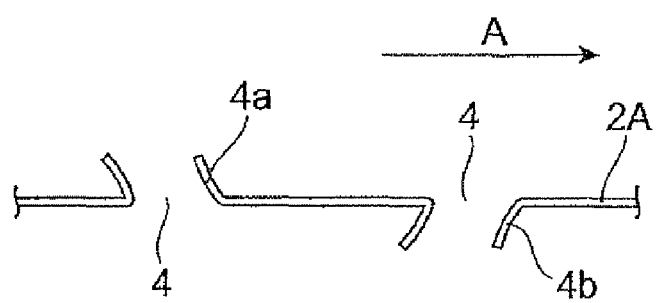
(C)
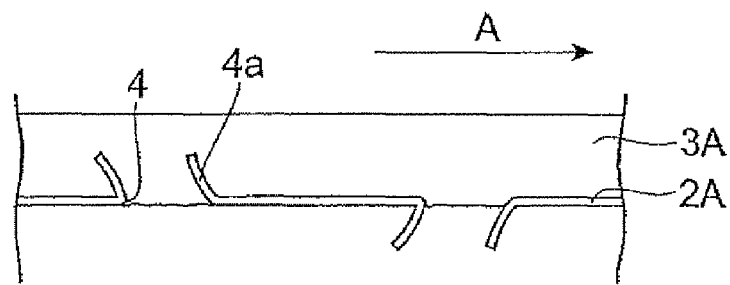

ELECTRODE

BACKGROUND OF THE INVENTION

1. Field of the Invention

The present invention relates to an electrode.

2. Related Background Art

Electrochemical devices such as primary batteries, secondary batteries (particularly, lithium-ion secondary batteries), electrolysis cells, and capacitors (particularly, electrochemical capacitors) are widely used in various fields. An electrode for such electrochemical devices is constructed normally in such a structure that an active material layer is laid on a plate-like current collector having through holes and this active material layer contains a large number of particles containing an active material.

It is important for the foregoing electrode to improve adhesion between the current collector and the active material layer, in order to achieve improvement in performance. For this reason, a variety of techniques have been researched in order to improve the adhesion between the current collector and the active material, layer. For example, Japanese Patent Application Laid-open No. 2004-103462 (Patent Literature 1) shows a core member (current collector) for an electrode with a plurality of holes made by piercing a metal foil member from both of the top and back sides and leaving curves or burrs extending perpendicularly to the both sides.

SUMMARY OF THE INVENTION

The technology described in Patent Literature 1 improves the adhesion between the current collector and the active material layer because of the existence of the curves or burrs on the surface of the current collector, but has a problem that there is variation in electrically conducting paths between the active material in the active material layer and the current collector. Namely, the distance between the current collector and the active material is short near a curve or burr and thus the electrically conducting paths are short there. However, the active material located away from the curves or burrs is distant from the current collector and the electrically conducting paths become longer. As a result, the electrode failed to achieve sufficient reduction in impedance and it was a hindrance to further improvement in output characteristics.

The present invention has been accomplished in light of the above-described circumstances and an object of the invention is to provide an electrode with high adhesion between the current collector and the active material layer and with low impedance.

In order to achieve the above object, an electrode according to the present invention is an electrode comprising a current collector having a plurality of through holes, and an active material layer provided on a surface of the current collector, wherein the current collector has projections extending from edges of the through holes to the outside of the through holes, and an angle between each of the projections and the surface of the current collector is in the range of 30 to 80°.

According to the present invention, the angle between each of the projections extending from the current collector of the electrode and the surface of the current collector is in the range of 30 to 80° and the inclined projections are surrounded by the active material layer; therefore, a physical anchor effect is achieved, so as to realize high adhesion between the current collector and the active material layer. Since the projections are inclined relative to the surface of the current collector, the distance becomes shorter between the current collector including the projections, and the active material, which was located apart from the projections extending perpendicularly to the surface of the current collector in the conventional technology. Therefore, the electrically conducting paths become shorter and the impedance is reduced.

When the angle between each projection and the surface of the current collector is in the range of 40 to 60°, the impedance is more suitably reduced.

A ratio of a distance between a tip of the projection and the surface of the current collector to a thickness of the active material layer is preferably in the range of 0.24 to 0.99. In this case, it is feasible to suitably maintain the high adhesion between the current collector including the projections, and the active material layer and to more effectively reduce the impedance.

A configuration for effectively achieving the above-described action is specifically a configuration wherein the through holes are quadrangular, wherein the projections are provided on respective sides forming the edges of the through holes so as to extend each to the outside of the through holes, and wherein a pair of projections extending from two adjacent sides of each through hole, out of the projections provided on the respective sides, extend in a direction to close the through hole and the other pair of projections extending from the sides different from the two adjacent sides extend in a direction to extend away from the through hole.

The present invention provides the electrode with high adhesion between the current collector and the active material layer and with low impedance.

BRIEF DESCRIPTION OF THE DRAWINGS

FIGS. 4A, 4B and 4C are drawings to illustrate a current collector sheet 2A flowing in the electrode producing apparatus 100.

DESCRIPTION OF THE PREFERRED EMBODIMENTS

The best mode for carrying out the present invention will be described below in detail with reference to the accompanying drawings. In the description of the drawings identical or similar elements will be denoted by the same reference symbols, without redundant description.

Figure 1:
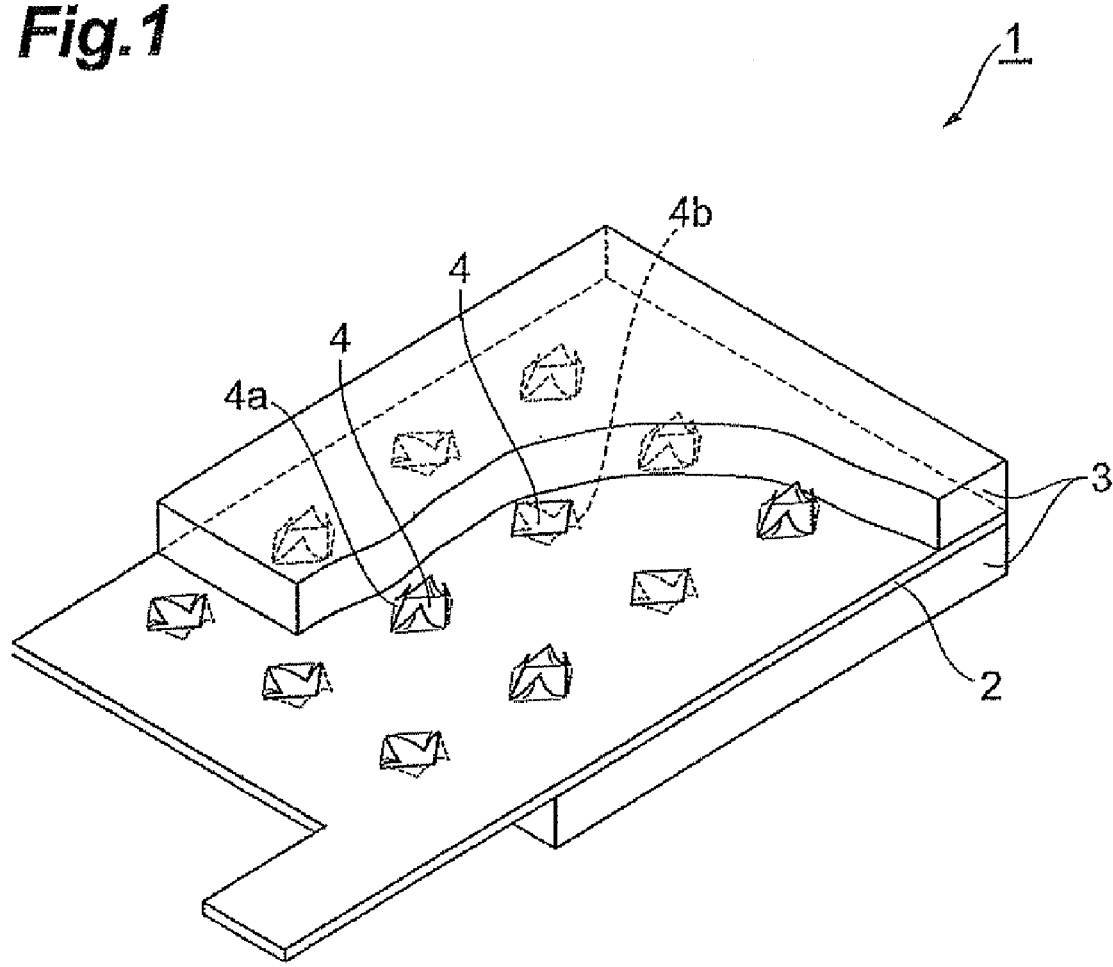
FIG. 1 is a schematic configuration diagram showing an electrode 1 according to a preferred embodiment of the present invention.
Figure 2:
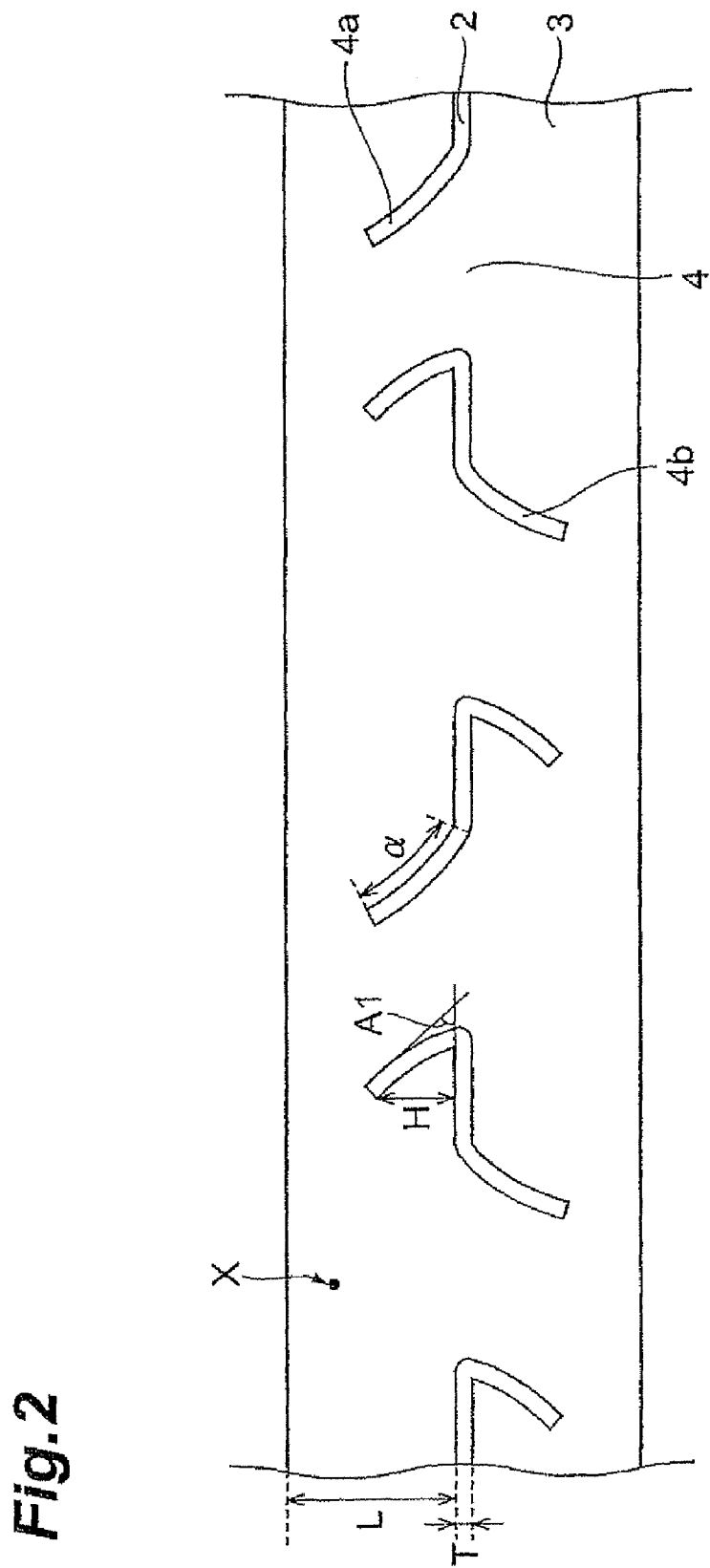
FIG. 2 is a sectional view of the electrode 1 according to the preferred embodiment of the present invention.

FIG. 1 is a schematic configuration diagram showing an electrode 1 according to the preferred embodiment of the present invention. FIG. 2 is a sectional view of the electrode 1.

The electrode 1 of the present embodiment, as shown in FIG. 1, is composed of a current collector 2, and active material layers 3 disposed on the top side and on the back side, respectively, of the current collector 2. The electrode 1 shown in FIG. 1 is suitably applicable to electrochemical devices such as primary batteries, secondary batteries (particularly, lithium-ion secondary batteries), electrolysis cells, and capacitors (particularly, electrochemical capacitors).

There are no particular restrictions on the current collector 2 as long as it is an electrically conductive sheet; for example, preferably applicable materials are copper, aluminum, and so on. There are no particular restrictions on the thickness and shape of the current collector 2, but the current collector 2 can be, for example, a belt-like sheet having the thickness (corresponding to thickness T in FIG. 2) in the range of 10 to 30 µm and the width in the range of 50 mm to 2000 mm.

The active material layers 3 are formed on the top side and on the back side, respectively, of the current collector 2. The active material layers 3 are layers containing a positive-electrode or negative-electrode active material. The active material can be any one of known materials. For example, positive-electrode active materials for lithium secondary batteries are, typically, lithium oxides such as $LiCoO_2$ and $LiMn_2O_4$, and another applicable active material is one or a combination of two or more species of chalcogen compounds such as $TiS_2$, $MnO_2$, $MoO_2$, and $V_2O_5$. Negative-electrode active materials for lithium secondary batteries preferably used are lithium, lithium alloys, or carbonaceous materials such as graphite, carbon black, and acetylene black. Examples of electrodes for electric double layer capacitors include a variety of porous materials with electron conductivity. For example, preferably applicable materials include carbon materials such as natural graphite, artificial graphite, mesocarbon microbeads, mesocarbon fiber (MCF), cokes, glasslike carbon, and burned substances of organic compounds.

The active material layers 3 further contain, a binder and others, in addition to the aforementioned active material. It may contain an electrical conducting agent or the like if necessary. There are no particular restrictions on the binder forming the active material layers 3, as long as it can secure the foregoing active material, electrical conducting agent, etc. to the current collector; it can be one of various binding agents. For example, applicable binders include fluorocarbon polymers such as polyvinylidene fluoride (PVDF) and polytetrafluoroethylene (PTFE), mixtures of styrene-butadiene rubber (SBR) and water-soluble polymers (carboxymethyl cellulose, polyvinyl alcohol, sodium polyacrylate, dextrin, gluten, etc.), and so on. The electrical conducting agent can be one selected, for example, from carbon blacks, metal fine powders of copper, nickel, stainless steel, iron, etc., mixtures of carbon material and metal fine powder, and electroconductive oxides such as ITO (Indium Tin Oxide).

The active material layers 3 are formed by Mixing the above-described materials, for example, with a solvent such as ether or ketone, kneading or dispersing them to prepare a coating solution for formation of active material layer, applying the coating solution onto the current collector 2, and drying it. The details thereof will be described later.

The current collector 2 is provided with through holes 4 and has projections 4a extending on the top side of the current collector 2 and projections 4b extending on the back side of the current collector 2 from the edges of the through holes 4. There are no particular restrictions on a method for forming the through holes 4 and projections 4a, 4b, but the projections (4a, 4b) are formed, for example, by piercing an electroconductive sheet used as the current collector 2, to break the electroconductive sheet at hole portions (to become the through holes 4) with a tool or the like from both sides, and thereby to bend the sheet in a piercing direction of the tool. The method of forming the through holes 4 and projections 4a, 4b can be appropriately modified, for example, by altering the shape at the tip of the tool so as to facilitate formation of projections 4a, 4b on the occasion of forming the through holes 4. The current collector 2 in the present embodiment is provided with the rhombic through holes 4, but the shape of the through holes 4 may be a quadrangular shape or any other shape such as a circle. The shape of the through holes 4 can be changed by the shape of the tool or the like for formation of the through holes 4, the method of forming the through holes 4, and so on. For example, when the tip of the tool is of a quadrilateral pyramid shape, the through holes 4 are readily formed in a quadrilateral shape as shown in FIGS. 1 and 4. The current collector preferably applicable is, for example, a pricked metal sheet obtained by forming the through holes 4 in the electroconductive sheet with the tool of the shape of through holes 4 as described above, or an expanded metal sheet obtained by forming cuts in a zigzag pattern in the electroconductive sheet and expanding the cuts into a rhombic or hexagon shape.

As shown in FIG. 2, the projections 4a, 4b extend on the top side and on the back side, respectively, of the current collector 2. When the projections 4a, 4b are made by an ordinary forming method, they are formed on the occasion of forming the through holes 4 and thus the size thereof varies depending upon the size of through holes 4. The size of projections 4a, 4b also varies depending upon a situation of breakage of the electroconductive sheet with the tool, but the length a from the edge of through hole 4 is preferably in the range of 30 µm to 100 µm and particularly preferably 70 µm. When the length α of projections 4a, 4b falls within this range, the projections 4a, 4b are widely arranged in the active material layers 3. When the length α of projections 4a, 4b is in the foregoing range, the thickness L of each of the active material layers 3 formed on the top side and on the back side of the current collector 2 is preferably in the range of 50 to 200 µm. Furthermore, when H represents a distance between the tip of each projection 4a, 4b and a surface of the sheet part (main body part) of the current collector 2, a ratio (H/L) of distance H to thickness L is preferably in the range of 0.24 to 0.99. When the ratio H/L is in the foregoing range, the provision of projections 4a, 4b offers greater shortening of electrically conducting paths and reduction in impedance resulting therefrom.

An angle between each projection 4a, 4b and the sheet part (main body part) of the current collector 2 is preferably in the range of 30 to 80° and more preferably in the range of 40 to 60°. The angle between the projection 4a, 4b and the sheet part of the current collector 2 herein refers to, for example, angle A1 shown in FIG. 2. Specifically, the angle A1 is an acute angle part out of angles made between the surface part of the sheet and a tangent line to the tip part of projection 4a, at an intersection of an extension of the tangent line to the tip part of projection 4a with the surface part of the sheet of the current collector 2. When the projections 4a, 4b have an inclination in the foregoing range, instead of extending vertically to the current collector 2, as described above, a physical anchor effect is achieved, so as to provide an effect of enhancing adhesion between the current collector 2 including the projections 4a, 4b, and the active material layers 3. When the projections 4a, 4b have the inclination in the aforementioned range, the electrode further has an effect of shortening electrically conducting paths between the active material in the active material layers 3 around the projections 4a, 4b and the current collector including the projections 4a, 4b.

In the current collector 2 shown in FIGS. 1 and 2, the rhombic through holes 4 are formed and the projections 4a, 4b extend from the respective sides of the rhombic shape forming the edges of through holes 4. Some of four projections 4a, 4b extending from one through hole 4 are inclined in a direction to cover the through hole 4, while the other projections 4a, 4b are inclined in a direction to extend away from the through hole 4. As a consequence, all the projections 4a, 4b on the current collector 2 are configured so as to be inclined in the same direction (to the left in FIG. 2) and the angles between the projections 4a, 4b and the main body part of the current collector 2 fall within the aforementioned range. In the current collector 2 forming the electrode 1 in the present embodiment, all the projections 4a, 4b are inclined in the same direction as described above, but they do not always have to be inclined in the same direction. Namely, it is sufficient that the angles of the projections 4a, 4b with the sheet part of the current collector 2 fall within the aforementioned range, and there are no particular restrictions on the direction of inclination thereof. Even if the projections 4a, 4b are inclined in different inclination directions, the inclination of the projections 4a, 4b also presents the foregoing effects of improvement in adhesion and reduction in impedance.

There are no particular restrictions on the shape and size of through holes 4 formed in the current collector 2, either, but the through holes 4 are preferably formed in such size that the length α of projections 4a, 4b falls within the aforementioned range (30 μm to 100 μm); for example, the through holes 4 can be formed in the rhombic shape with each side of 150 μm as shown in FIG. 1. There are no particular restrictions on the number of through holes 4, either, but the through holes 4 with the projections 4a, 4b are preferably provided in the number not to significantly degrade the durability of the current collector 2, while enhancing the aforementioned effect of shortening electrically conducting paths.

Figure 5:
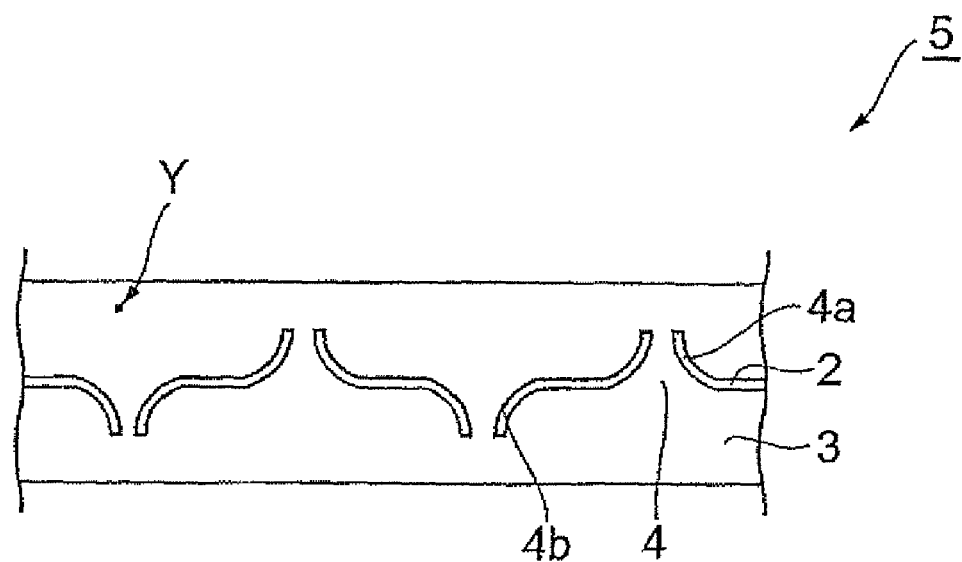
FIG. 5 is a sectional view showing a configuration of a conventional electrode 5.

The effect of shortening electrically conducting paths will be described below using FIGS. 2 and 5. FIG. 5 is a sectional view showing a configuration of a conventional electrode 5. In the conventional electrode 5, projections 4a, 4b extend each perpendicularly to the current collector 2 from the edges of through holes 4 of the current collector 2. Therefore, the active material in the active material layers 3 near the projections 4a, 4b is located near the current collector 2 and thus the electrically conducting path is short between them. However, as to a point, for example, like point Y in FIG. 5, which is located above a through hole 4 and at which the projection 4b extends in the opposite direction to the point Y (on the back side of the current collector), the point becomes farther from the projections 4a, 4b and the main body of the current collector 2 and thus the electrically conducting path becomes longer between them. Therefore, this longer electrically conducting path increases the impedance and it was infeasible to achieve sufficient reduction in impedance as a whole of electrode 5.

On the other hand, in the electrode 1 of the present embodiment, where point X is defined at a point which is located above a through hole 4 like point Y in FIG. 5, and at which the projection 4b extends in the opposite direction (on the back side of the current collector) to the point Y, the distance from the main body (sheet part) of the current collector 2 is the same as in the electrode 5 in FIG. 5, but the distance between the projection 4a and the point X becomes shorter, when compared with the point Y in FIG. 5, because the projection 4a extending on the top side of the current collector 2 is inclined toward the point X. Therefore, the electrically conducting path by the active material at point X becomes shorter than the electrically conducting path by the active material at point Y. Since the electrically conducting paths of the active material can be shortened when compared with the conventional electrode 5 as described above, the impedance can be adequately reduced as a whole of the electrode 1 and thus output characteristics can be improved thereby. In addition, the projections 4a, 4b adhere tightly to the active material layers 3, whereby high adhesion can also be maintained between the current collector 2 and the active material layers 3.

The below will describe a method of producing the above electrode 1, using FIGS. 3 and 4.

Figure 3:
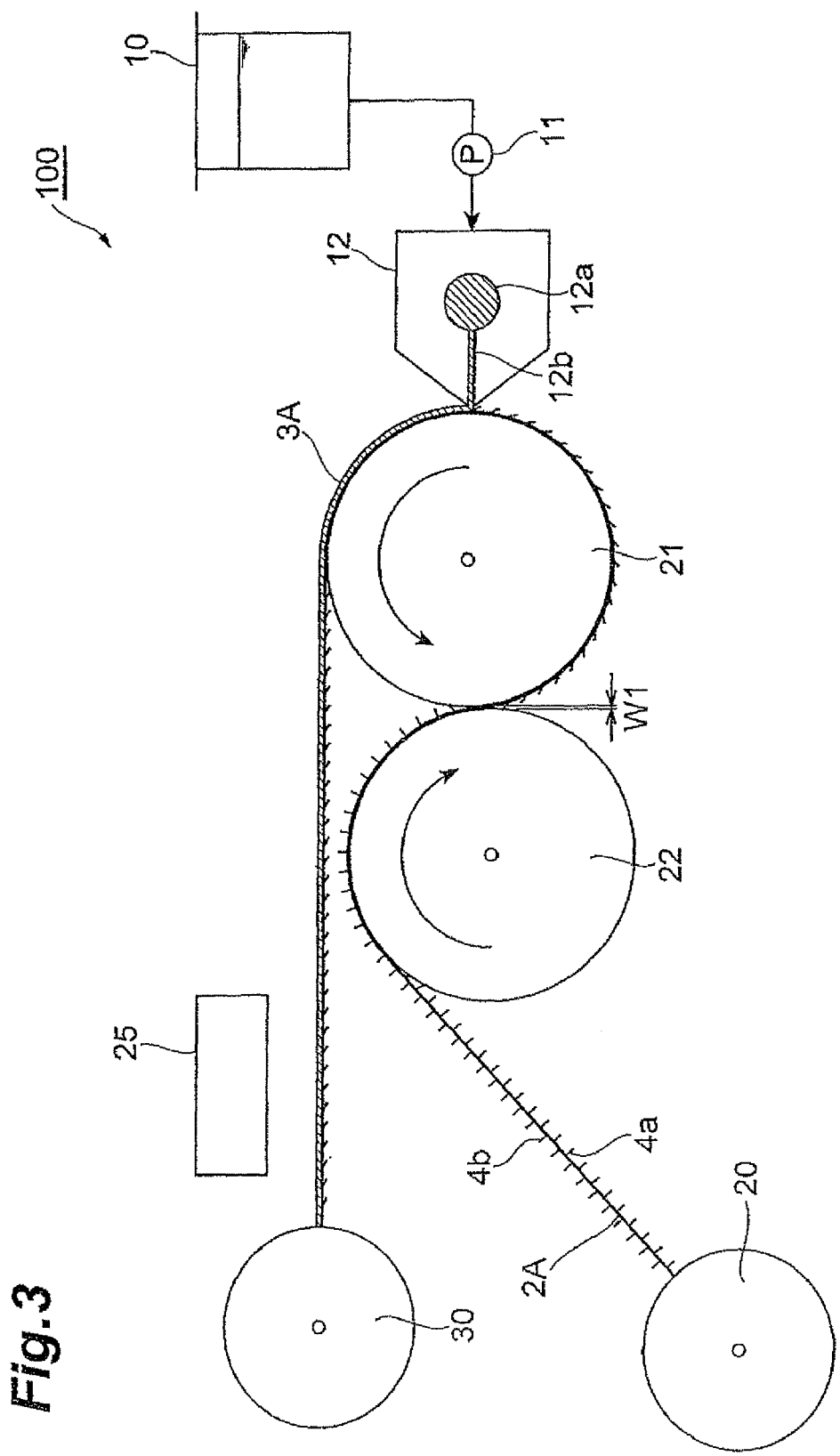
FIG. 3 is a schematic configuration diagram showing an electrode producing apparatus 100 for producing the electrode 1 according to the preferred embodiment of the present invention.

As shown in FIG. 3, an electrode producing apparatus 100 for producing the electrode 1 according to the present embodiment is constructed with a coating solution tank 10, a coating solution supply pump 11, a slit die 12, a sheet supply reel 20, a backup roll 21, a nip roll 22, a drier 25, and a take-up reel 30.

The coating solution tank 10 stores a coating solution for formation of active material layer. The coating solution for formation of active material layer contains the aforementioned active material, binder, electrical conducting agent, solvent, and so on. The viscosity of the coating solution is, for example, preferably in the range of 50 P to 500 P and more preferably in the range of 100 to 300 P A supply line L1 connects between the coating solution tank 10 and the slit die 12. The pump 11 which supplies the solution in the coating solution tank 10 to the slit die 12 at a constant rate is connected to the supply line L1. The pump 11 to be used herein can be, for example, a precision gear pump.

The sheet supply reel 20 is a reel which supplies the current collector sheet 2A, onto which the coating solution for formation of active material layer is to be applied, to the electrode producing apparatus 100. The take-up reel 30 is a reel which takes up the current collector sheet 2A having passed through the steps of being supplied from the sheet supply reel 20, being coated with the coating solution for formation of active material layer, and being dried by the drier 25 to form the active material layer. An unrepresented motor is connected to the take-up reel 30 and has a function to take up the current collector sheet 2A through rotation of the take-up reel 30 at a fixed rate.

The projections 4a, 4b are preliminarily formed on both sides of the current collector sheet 2A used in the electrode producing apparatus 100 of the present embodiment. There are no particular restrictions on how to form the projections 4a, 4b, as described above.

The backup roll 21 is a rotatable roll of a cylindrical shape. The current collector sheet 2A which is supplied from the sheet supply reel 20 and which is taken up by the take-up reel 30 is wound around the backup roll 21 whereby the current collector sheet 2A is guided. There are no particular restrictions on the diameter of the backup roll 21, but the outside dimension thereof can be, for example, in the range of 10 to 250 mm. There are no particular restrictions on a rotating speed of the backup roll 21, but it is preferable to set a linear velocity on the peripheral surface of the backup roll 21 so as to be equal to a line speed (take-up speed of the current collector sheet 2A by the take-up reel 30), for the purpose of preventing a sag of the current collector sheet 2A wound.

The slit die 12 has a slit 12b provided with an opening along the axial direction of the backup roll 21. This slit die 12 is configured to spread the liquid flowing thereinto from an entrance of the slit die 12, in the width direction of the current collector sheet 2A in a manifold 12a provided as a hollow space inside the slit die 12 and extending in the axial direction of the backup roll 21, and to discharge the liquid in a sheet form through the slit 12b and from the exit opening. This step is to apply the coating solution 3A onto the surface of the current collector sheet 2A. The thickness of a coating solution layer formed on the surface of the current collector sheet 2A is preferably in the range of 50 to 200 μm.

The coating solution 3A applied on the surface of the current collector sheet 2A is dried by the drier 25 provided on the way of movement by the take-up reel 30. The drier 25 can be a hot-wire heater, a steam heater, an infrared heater, or the like.

The nip roll 22 is disposed between the sheet supply reel 20 and the backup roll 21 and is arranged so that the axis of the nip roll 22 becomes parallel to the axis of the backup roll 21. This nip roll 22 has a function to wind the current collector sheet 2A supplied from the sheet supply reel 20, around the backup roll 21. Furthermore, the nip roll 22 has a function to incline the projections 4*a*, 4*b* on the current collector sheet 2A by pressing the collector sheet 2A against the peripheral surface of the backup roll 21 on the occasion of winding the current collector sheet 2A around the backup roll 21.

The below will detail a method of inclining the projections 4*a*, 4*b* on the current collector sheet 2A by press by the nip roll.

When the nip roll 22 is arranged so that a distance W1 between the peripheral surface of the nip roll 22 and the peripheral surface of the backup roll 21 is smaller than the sum of the thickness of the current collector sheet 2A and the length of the projections 4*a*, 4*b* formed perpendicularly to the current collector sheet 2A (i.e., the total thickness including the main body part of the current collector and the projections 4*a*, 4*b*), the sheet is moved along the peripheral surfaces of the nip roll 22 and backup roll 21 while the projections 4*a*, 4*b* are pressed each against the current collector sheet 2A, whereby the projections 4*a*, 4*b* are inclined in the direction opposite to the flowing direction of the current collector sheet 2A. The distance W1 is normally made approximately equal to the thickness of the current collector sheet 2A.

FIG. 4 is a drawing to illustrate the current collector sheet 2A flowing in the electrode producing apparatus 100. In FIGS. 4, (A) and (B) are views showing the current collector sheet 2A immediately after the projections 4*a*, 4*b* are inclined by the nip roll 22 and the backup roll 21, wherein FIG. 4(A) is a view from the top side of the current collector sheet 2A traveling in a direction indicated by arrow A (to the right in FIG. 4) and FIG. 4(B) is a sectional view along line IVB-IVB thereof. As shown in (A) and (B) of FIG. 4, the projections 4*a*, 4*b* extending from the through holes 4 all are inclined in the direction opposite to the moving direction. In the case where the through holes 4 provided in the current collector sheet 2A are rhombic and where a diagonal line thereof is parallel to the moving direction (arrow A) of the current collector sheet 2A, as shown in FIG. 4(A), the projections 4*a*, 4*b* provided on the edges on two adjacent sides out of the four sides forming the rhombic shape (in the case of FIG. 4(A), the two sides on the right side being the fore side in the moving direction with respect to each through hole 4) are inclined in a direction to close the through hole 4. On the other hand, the projections 4*a*, 4*b* provided on the edges on the other two sides (the two sides on the left side being the back side in the moving direction with respect to each through hole 4) are inclined in a direction to extend away from the through hole 4. When all the sides forming the through holes 4 are present in directions different from the moving direction of the current collector sheet 2A as described above, the projections 4*a*, 4*b* formed on the sides become inclined without being crushed by pressing under movement in the electrode producing apparatus 100.

The linear pressure in pressing the current collector sheet 2A is preferably in the range of 2 to 50 kgf/cm and more preferably in the range of 5 to 15 kgf/cm though it depends on the material and thickness of the current collector sheet 2A, the length of the projections 4*a*, 4*b*, and so on. If the linear pressure is larger than 50 kgf/cm, the current collector sheet 2A can be damaged as the projections 4*a*, 4*b* are inclined. If the linear pressure is smaller than 2 kgf/cm, the projections 4*a*, 4*b* can fail to be adequately inclined.

In the electrode producing apparatus 100 shown in FIG. 3, the nip roll 22 presses the sheet against the peripheral surface of the backup roll 21 to incline the projections 4*a*, 4*b* of the current collector sheet 2A in the direction opposite to the moving direction, and then the current collector sheet 2A is continuously conveyed along the backup roll 21 to the opening of the slit die 12. The coating solution supplied from the slit die 12 is delivered onto the surface of the current collector sheet 2A (the surface on which the projections 4*a* are formed). FIG. 4(C) is a sectional view of the current collector sheet 2A under supply of the coating solution 3A in an inclined state of the projections 4*a*, 4*b*. In this manner, the coating solution 3A is applied to the surroundings of the inclined projections 4*a*. Then the coating solution is dried to form the active material layer on one side of the current collector sheet 2A.

If the projections 4*a* on the current collector sheet 2A catch on the slit die 12, there can arise such problems as failure in application due to occurrence of positional deviation of the current collector sheet 2A and breakage of the current collector sheet 2A, as well as a problem of uneven thickness of coating film. In the case of the current collector sheet 2A of the present embodiment, however, the projections 4*a* are inclined in the direction opposite to the conveyance direction of the current collector sheet 2A and thus inclined in the same direction as the moving direction of the slit die 12 relative to the current collector sheet 2A. Therefore, this configuration suppresses occurrence of such an accident that the projections 4*a* face the slit die 12 and catch thereon at the tip; as a result, it can reduce occurrence of the various problems to be expected in the event that the projections 4*a* catch on the slit die 12.

After this process, the current collector sheet 2A with the active material layer on one side is arranged so that the other side becomes the surface to be coated with the coating solution 3A, in the current collector sheet 2A (in the present embodiment, so that the back side of the current collector sheet 2A is the surface to be coated). Then the nip roll 22 again presses the current collector sheet 2A to incline the projections and then the coating solution 3A is continuously applied and dried. The above results in forming the active material layers on both sides of the current collector sheet 2A. Thereafter, this sheet is cut in a predetermined size to obtain the electrode 1 according to the present embodiment.

In the electrode producing method using the electrode producing apparatus 100 according to the present embodiment, as described above, the active material layers are formed in such a manner that the coating solution 3A is applied onto the current collector sheet 2A in a state in which the projections 4*a*, 4*b* on the current collector sheet 2A are inclined by press by the nip roll 22. Therefore, the projections are inclined in the definite direction as shown in FIG. 2, so that the electrode 1 can be produced with reduced impedance. At the same time, since the coating solution is supplied at a point of time in a thermally active state, the adhesion between the current collector and the active material layers is further enhanced when compared with the conventional case using punched metal.

In the case of the electrode producing method using the electrode producing apparatus 100, when the projections are formed so as to originate from the sides extending in the directions different from the moving direction of the current collector sheet 2A moving in the electrode producing apparatus 100 as shown in FIG. 4(A), it is feasible to reduce breakage of projections due to the press on the projections, and thereby to more effectively realize reduction of impedance and improvement in adhesion.

The above described the preferred embodiment of the present invention, but it should be noted that the present invention is by no means limited to the above embodiment but can be modified in various ways.

For example, the electrode producing apparatus 100 according to the embodiment of the present invention was described using the slit die 12 as a device for applying the coating solution, but any other device can be used as long as it is a device capable of continuously applying the coating solution after the inclining step of the projections 4a, 4b. For example, it is possible to adopt a configuration in which the coating solution is applied by use of a mill roller, a doctor blade, or the like.

The electrode producing apparatus 100 of the present embodiment was described as to the method of inclining the projections 4a, 4b by pressing the current collector sheet 2A by the nip roll 22, but it is noted that the projections 4a, 4b can also be inclined by another method. For example, it is also possible to adopt a method of inclining the projections 4a, 4b on the current collector sheet 2A by letting the current collector sheet pass through a slit having a space not less than the thickness of the main body part of the current collector sheet 2A excluding the projections 4a, 4b and smaller than the total thickness of the current collector sheet 2A including the projections 4a, 4b.

The current collector sheet 2 of the electrode 1 according to the embodiment of the present invention is provided with the inclined projections 4a, 4b on both of the top and back sides, but it is also possible to adopt a configuration wherein the projections are formed on only one side. This configuration also offers the effects of achieving high adhesion between the inclined projections and the active material layer 3 formed on the surface on which the projections are provided, and reduction in impedance.

The present embodiment was described as to the method of forming the vertically extending projections on the occasion of preliminarily forming the through holes in the current collector sheet 2A, inclining the projections by the electrode producing apparatus 100, and thereafter applying the coating solution to form the active material layer, but the electrode according to the present embodiment can also be produced by another method different from the foregoing method. For example, it is also possible to adopt such a method that in a case where the through holes are formed by piercing the current collector sheet 2A with a tool, the tip of the tool is shaped with an inclination relative to the edges and the piercing length through the current collector sheet with the tool is adjusted so as to provide the current collector sheet with the projections having the same inclination as the shape of the tip of the tool.

EXAMPLE 1

A copper current collector sheet 20 μm thick was perforated to form rhombic through holes with the length of projections (burrs) being 70 μm in such arrangement that the rhombic through holes were alternately projecting at equal intervals of 500 μm from the top and back sides. The projections of this current collector sheet were inclined using the aforementioned electrode producing apparatus 100 and then the coating solution was applied onto the collector sheet to form the active material layer, thereby producing an electrode. At this time, the diameter of the nip roll 22 in the electrode producing apparatus 100 was 120 mm, the diameter of the backup roll 21 was 120 mm, and the line speed was 8 mm/min. The coating solution for formation of the active material layer was a solution obtained by mixing and dispersing 90 parts by mass of black lead (trade name: OMAC available from Osaka Gas Co., Ltd.) and 1 part by mass of graphite (trade name: KS-6 available from LONZA) as an active material, 2 parts by mass of carbon black (trade name: DAB available from DENKI KAGAKU KOGYO KABUSHIKI KAISHA) as an electrical conducting assistant, and 7 parts by mass of polyvinylidene fluoride (trade name: KYNAR 761 available from ATFINA) as a binding agent, thereafter adding an appropriate amount of N-methyl-pyrrolidone (NMP) as a solvent to adjust viscosity, and thereby preparing a slurry coating solution for negative electrode. The viscosity of the coating solution was 270 P. When the current collector sheet was pressed under the linear pressure of 40 kgf/cm by the nip roll, the angle between each projection and the current collector sheet 2 after completion of the inclining process by the nip roll 22 was 30°. Then the coating solution was applied so that the thickness L of the active material layer was 150 μm. The current collector sheet coated with the coating solution was dried to form the active material layer on one side. At this time, the ratio H/L of the distance H between the tip of the inclined projections and the surface of the current collector sheet to the thickness L of the active material layer was 0.23. The active material layer was formed on the other side by the electrode producing apparatus 100, and thereafter the current collector sheet with the active material layers on both sides was cut to obtain an electrode of Example 1. The impedance of this electrode was measured.

EXAMPLES 2-12 AND COMPARATIVE EXAMPLES 1-4

Electrodes of Examples 2-12 and Comparative Examples 1-4 were prepared by the same method in Example 1, except that the linear pressure in press by the nip roll 22 and the thickness L of the active material layer were changed to the conditions shown in Table 1. Among them, Comparative Example 1 was prepared using a current collector sheet obtained by forming the through holes and then removing the projections therefrom. As a consequence, the angle between the projections and the current collector sheet and H/L of each electrode were the values presented in Table 1. The impedance was measured for each of these electrodes.

Table 1 shows the results of Examples 1-12 and Comparative Examples 1-4. As shown in Table 1, it was confirmed that the impedance was reduced in Examples 1-12 as compared with Comparative Examples 1-4. The electrode of Example 3 had the structure in which the tip of some projections was projecting out from the active material layer, and a short circuit occurred in use as an electrode in some occasions.

TABLE 1

|  | Burr length [μm] | Angle [°] | Linear pressure in processing [kgf/cm] | Thickness L of active material layer [μm] | H/L | Impedance [mΩ] |
|---|---|---|---|---|---|---|
| Comparative Example 1 | — | 0 | — | 150 | — | 12.5 |
| Comparative Example 2 | 70 | 25 | 50 | 150 | 0.20 | 11.9 |
| Comparative Example 3 | 70 | 85 | 1.5 | 150 | 0.46 | 11.4 |
| Comparative Example 4 | 70 | 90 | 0 | 150 | 0.47 | 10.9 |

TABLE 1-continued

|  | Burr length [μm] | Angle [°] | Linear pressure in processing [kgf/cm] | Thickness L of active material layer [μm] | H/L | Impedance [mΩ] |
|---|---|---|---|---|---|---|
| Example 1 | 70 | 30 | 40 | 150 | 0.23 | 9.4 |
| Example 2 | 70 | 40 | 20 | 150 | 0.30 | 7.1 |
| Example 3 | 70 | 45 | 15 | 45 | 1.10 | 6.7 |
| Example 4 | 70 | 45 | 15 | 50 | 0.99 | 5.7 |
| Example 5 | 70 | 45 | 15 | 100 | 0.49 | 6.1 |
| Example 6 | 70 | 45 | 15 | 150 | 0.33 | 6.2 |
| Example 7 | 70 | 45 | 15 | 200 | 0.25 | 6.4 |
| Example 8 | 70 | 45 | 15 | 210 | 0.24 | 7.8 |
| Example 9 | 70 | 50 | 10 | 150 | 0.36 | 6.8 |
| Example 10 | 70 | 60 | 5 | 150 | 0.40 | 7.1 |
| Example 11 | 70 | 70 | 3 | 150 | 0.44 | 9.3 |
| Example 12 | 70 | 80 | 2 | 150 | 0.46 | 9.6 |

What is claimed is:

1. An electrode comprising:
a current collector having a plurality of through holes; and
an active material layer provided on a surface of the current collector, wherein
the current collector has four-segmented projections extending from edges of the through holes to the outside of the through holes,
an angle between each of the projections and the surface of the current collector is in the range of 30 to 80°,
the through holes are quadrangular,
the projections are provided on respective sides forming the edges of the through holes so as to extend each to the outside of the through holes, and
a pair of projections of the four-segmented projections extending from two adjacent sides of one through hole, out of the projections provided on the respective sides of each through hole, extend in a direction to close the through hole and the other pair of projections of the four-segmented projections extending from the sides different from the two adjacent sides extend in a direction to extend away from the through hole.

2. The electrode according to claim 1, wherein the angle between each of the projections and the surface of the current collector is in the range of 40 to 60°.

3. The electrode according to claim 1, wherein a ratio of a distance between each tip of the projections and the surface of the current collector to a thickness of the active material layer is in the range of 0.24 to 0.99.

* * * * *